United States Patent
Liu et al.

(10) Patent No.: US 10,671,860 B2
(45) Date of Patent: Jun. 2, 2020

(54) PROVIDING INFORMATION-RICH MAP SEMANTICS TO NAVIGATION METRIC MAP

(71) Applicant: GM GLOBAL TECHNOLOGY OPERATIONS LLC, Detroit, MI (US)

(72) Inventors: Hansi Liu, Highland Park, NJ (US); Fan Bai, Ann Arbor, MI (US); Shuqing Zeng, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 131 days.

(21) Appl. No.: 15/900,149

(22) Filed: Feb. 20, 2018

(65) Prior Publication Data
US 2019/0258876 A1 Aug. 22, 2019

(51) Int. Cl.
*G06K 9/00* (2006.01)
*G06T 17/10* (2006.01)

(52) U.S. Cl.
CPC ..... *G06K 9/00805* (2013.01); *G06K 9/00208* (2013.01); *G06T 17/10* (2013.01); *G06T 2210/12* (2013.01)

(58) Field of Classification Search
CPC ............ G06K 9/00805; G06K 9/00208; G06T 17/10; G06T 2210/12
See application file for complete search history.

(56) References Cited

U.S. PATENT DOCUMENTS

| | | | | |
|---|---|---|---|---|
| 10,509,947 | B1 * | 12/2019 | Douillard | G06K 9/6269 |
| 2013/0236047 | A1 * | 9/2013 | Zeng | G01S 13/726 |
| | | | | 382/103 |
| 2018/0025636 | A1 * | 1/2018 | Boykin | G08B 13/19656 |
| | | | | 701/1 |

* cited by examiner

*Primary Examiner* — Siamak Harandi
(74) *Attorney, Agent, or Firm* — Cantor Colburn LLP (57) ABSTRACT

A system and method of operating a vehicle. The system includes a two-dimensional imager, a three-dimensional imager, and at least one processor. The two-dimensional imager obtains a two-dimensional image of an environment surrounding the vehicle, wherein the environment includes an object. The three-dimensional imager obtains a three-dimensional (3D) point cloud of the environment. The at least one processor identifies the object from the 2D image and assigns the identification of the object to a selected point of the 3D point cloud.

17 Claims, 6 Drawing Sheets

PROVIDING INFORMATION-RICH MAP SEMANTICS TO NAVIGATION METRIC MAP

INTRODUCTION

The subject disclosure relates to systems and methods of autonomous or semi-autonomous vehicles that integrate two different maps of the environmental surroundings of one vehicle to aid operations of the vehicle.

An autonomous or semi-autonomous vehicle includes various sensors that provide multiple forms of data regarding the objects in the environmental surroundings of the vehicle. One set of data can be used to provide a three-dimensional point cloud of the environment. Another set of data can be used to perform semantic segmentation of the environment from a two-dimensional image, allowing the vehicle to identify objects in the environment. These different data sets are generally used separately for autonomous driving purposes but do not provide a semantic map in three-dimensional spaces. Thus, it is desirable to provide a method that combines the data obtained from two-dimensional images with the data acquired from the three-dimensional point cloud to generate an enhanced knowledge of the vehicle's environment.

SUMMARY

In one exemplary embodiment, a method of operating a vehicle is disclosed. The method includes obtaining at a processor a two-dimensional (2D) image of an environment surrounding the vehicle, wherein the environment includes an object, obtaining at the processor a three-dimensional (3D) point cloud of the environment, identifying by the processor the object from the 2D image, and assigning by the processor the identification of the object to a selected point of the 3D point cloud.

In addition to one or more of the features described herein, the method further includes determining a bounding box for the object from the 2D image and providing the bounding box to the 3D point cloud in order to assign the bounding to the selected point. The method further includes performing semantic segmentation on the 2D image to classify the object within the bounding box and providing the classification of the object to the selected point. The method further includes determining a template of the object from one or more points of the 3D point cloud using a first module, wherein the one or more points include the selected point, sending a coordinate of the template from the first module to a second module, wherein the second module determines one or more bounding boxes, sending a bounding box including the coordinate from the second module to the first module, and associating the bounding box with the selected point at the first module.

Determining the identification of the object from the 2D image further includes providing an initial identification from the vehicle to a remote processor and receiving a collective identification of the object form the remote processor, wherein the collective identification is an identification based on initial identifications received at the remote processor from a plurality of vehicles. For a semi-dynamic object, the method determines a state of the semi-dynamic object. The vehicle is navigated based on the identification of the selected point.

In another exemplary embodiment, a system for operating a vehicle is disclosed. The system includes a two-dimensional imager configured to obtain a two-dimensional image of an environment surrounding the vehicle, wherein the environment includes an object, a three-dimensional imager configured to obtain a three-dimensional (3D) point cloud of the environment, and at least one processor. The at least one processor is configured to identify the object from the 2D image and assign the identification of the object to a selected point of the 3D point cloud.

In addition to one or more of the features described herein, the at least one processor is further configured to determine a bounding box for the object from the 2D image and provide the bounding box to the 3D point cloud in order to assign the bounding box to the selected point. The at least one processor is further configured to perform semantic segmentation on the 2D image to classify the object within the bounding box and providing the classification of the object to the selected point. In embodiments, the at least one processor further includes a first processor configured to determine a template of the object from one or more points of the 3D point cloud using a first module, wherein the one or more points include the selected point, and a second processor that determines a bounding box from the 2D image, wherein the first processor sends a coordinate of the template to the second processor, the second processor sends a bounding box including the coordinate to the first processor, and the first processor assigns the selected point to the bounding box.

In one embodiment, the at least one processor is configured to determine a collective identification of the object from the 2D image by providing an initial identification from the vehicle to a remote processor and receiving the collective identification of the object from the remote processor, wherein the collective identification is an identification based on initial identifications received at the remote processor from a plurality of vehicles. For a semi-dynamic object, the at least one processor being further configured to determine a state of the semi-dynamic object. The at least one processor is configured to navigate the vehicle based on the identification of the selected point.

In yet another exemplary embodiment, a vehicle is disclosed. The vehicle includes a two-dimensional imager configured to obtain a two-dimensional image of an environment surrounding the vehicle, wherein the environment includes an object, a three-dimensional imager configured to obtain a three-dimensional (3D) point cloud of the environment, and at least one processor. The at least one processor is configured to identify the object from the 2D image, assign the identification of the object to a selected point of the 3D point cloud, and navigate the vehicle based on the identification of the selected point.

In addition to one or more of the features described herein, the at least one processor is further configured to determine a bounding box for the object from the 2D image and provide the bounding box to the 3D point cloud in order to assign the bounding box to the selected point.

The at least one processor is further configured to perform semantic segmentation on the 2D image to classify the object within the bounding box and providing the classification of the object to the selected point. In embodiments, the at least one processor further includes a first processor configured to determine a template of the object from one or more points of the 3D point cloud using a first module, wherein the one or more points include the selected point, and a second processor that determines a bounding box from the 2D image, wherein the first processor sends a coordinate of the template to the second processor, the second processor sends a bounding box including the coordinate to the first processor, and the first processor assigns the selected point to the bounding box.

In one embodiment, the at least one processor is configured to determine a collective identification of the object from the 2D image by providing an initial identification from the vehicle to a remote processor and receiving the collective identification of the object from the remote processor, wherein the collective identification is an identification based on initial identifications received at the remote processor from a plurality of vehicles. For an object that is a semi-dynamic object, the at least one processor is configured to determine a state of the semi-dynamic object.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
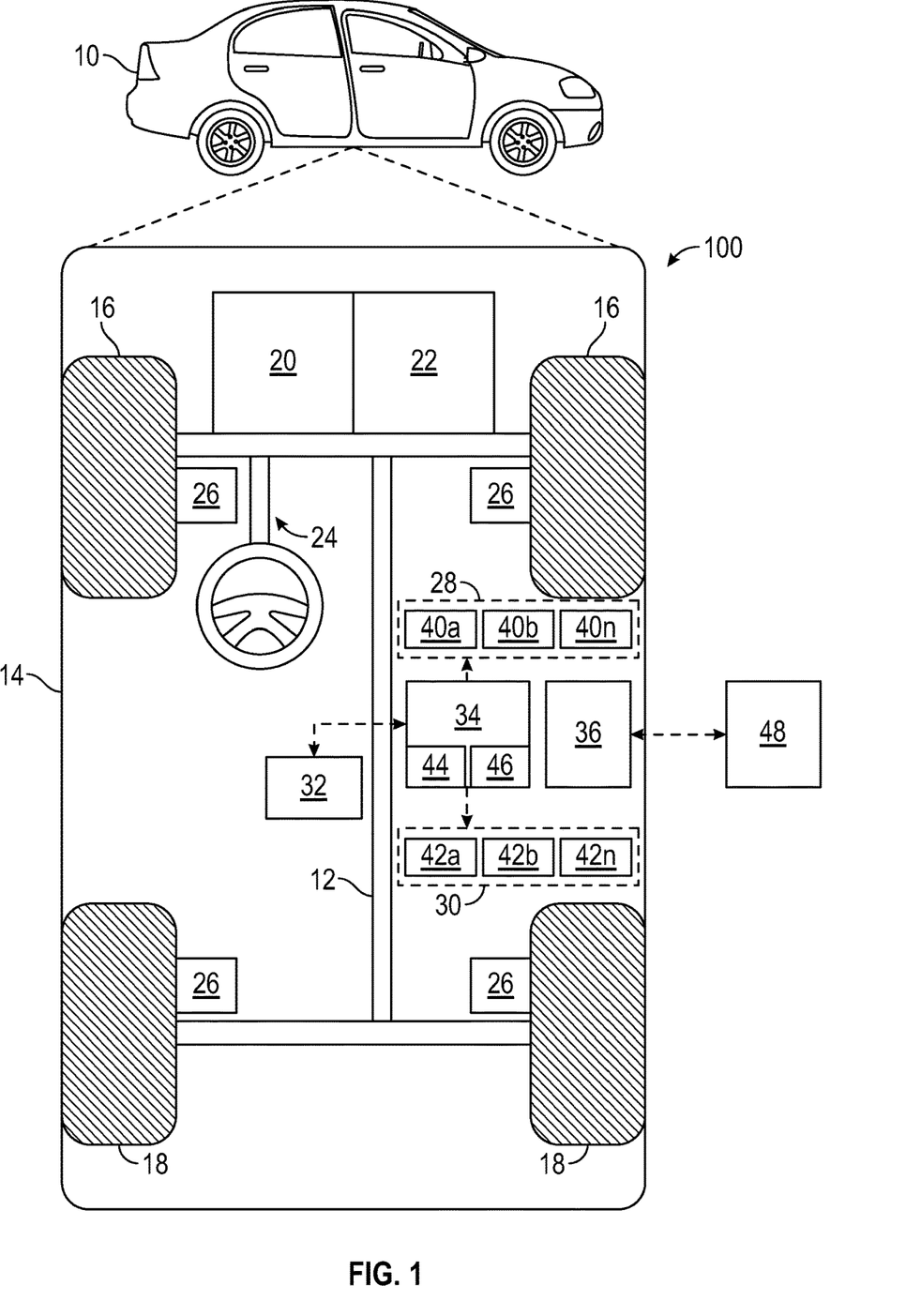
FIG. 1 shows a vehicle including an associated trajectory planning system in accordance with various embodiments.

In accordance with an exemplary embodiment, FIG. 1 shows a vehicle 10 with an associated trajectory planning system depicted at 100 in accordance with various embodiments. In general, the trajectory planning system 100 determines a trajectory plan for automated driving of the vehicle 100. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the trajectory planning system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the trajectory planning system 100 and, when executed by the processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

Figure 2:
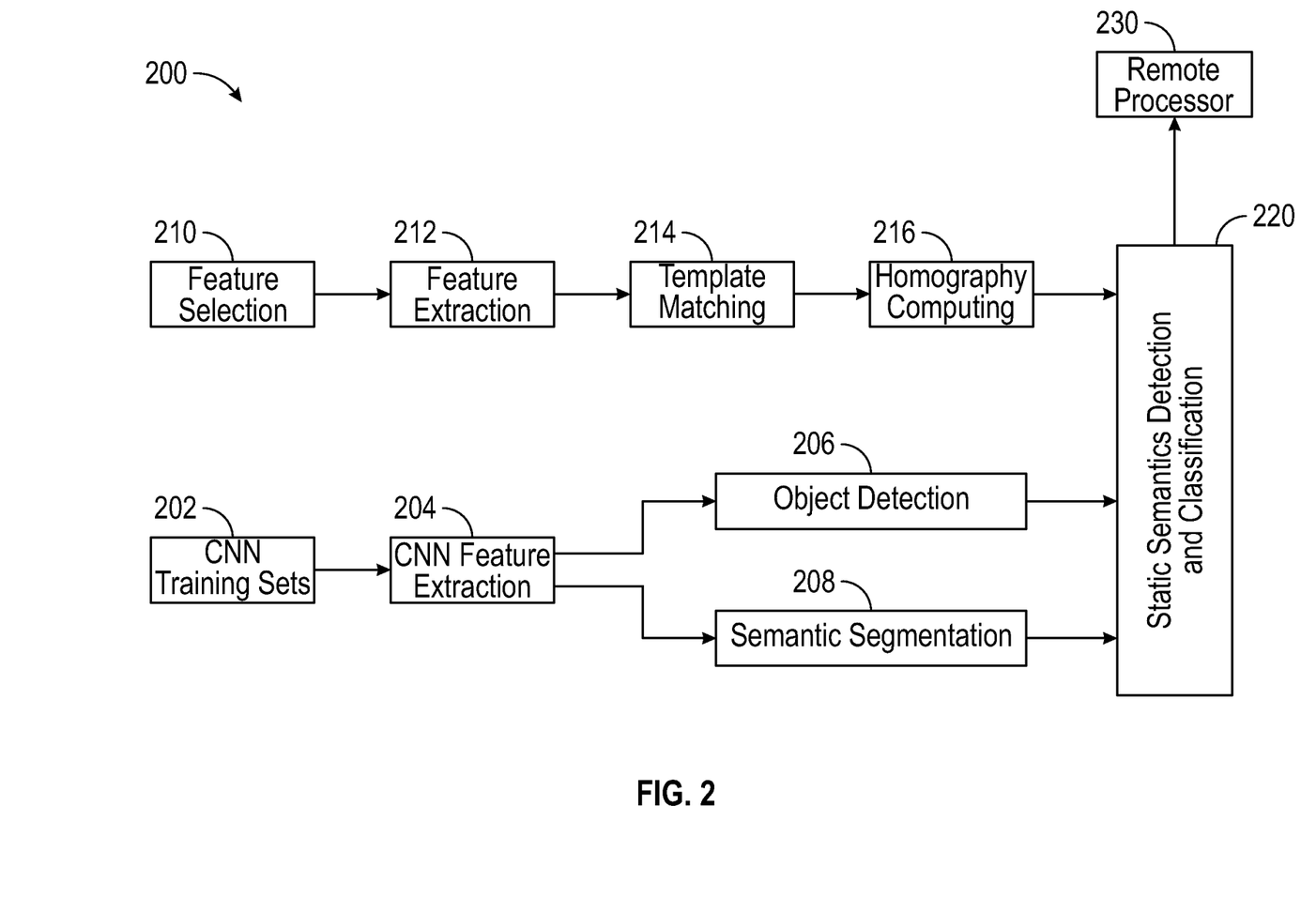
FIG. 2 shows a schematic diagram outlining a process for obtaining a persistent three-dimensional point cloud with semantic classification.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The trajectory planning system 100 includes a processor for navigating the vehicle 10 based on a three-dimensional determination of objects within the environment of the vehicle. The trajectory planning system includes a first camera system for obtaining a stereoscopic image of the environment. The first camera system can produce a three-dimensional point cloud of the surrounding environment. The locations of the points of the three-dimensional point cloud are affected by objects in the environment. The first camera system or a second camera system can be used to obtain a two-dimensional image of the environment. The three-dimensional point could and the two-dimensional image can be provided to one or more processors. The one or more processors can perform operations on the two-dimensional image to obtain boundary boxes for objects in the environment from the two-dimensional image and semantic segmentation of the two-dimensional image to identify and classify objects. The one or more processors can also identify objects in a three-dimensional point cloud. The bounding boxes can be combined with point clusters in the three-dimensional point cloud to group the points of as a single entity. Semantic segmentation can also be associated these grouped points to extend semantic classification into three-dimensions.

FIG. 2 shows a schematic diagram 200 outlining a process for obtaining a persistent three-dimensional point cloud with semantic classification. The diagram 200 includes two branches. A first branch (including boxes 202, 204, 206 and 208) includes methods for detecting and classifying objects in a two-dimensional image obtained from a digital camera of the vehicle. A second branch (including boxes 210, 212, 214, and 216) includes methods for obtaining a three-dimensional point cloud of the surrounding environment. The coordinates of points in the point cloud is determined by the locations of the objects or targets within the environment for the second branch.

In the first branch, box 202 includes training sets images that are provided to train a convolutional neural network (CNN). Once trained, in box 204 the CNN can be used on two-dimensional images obtained at the vehicle to perform feature extraction from the 2-D images in order to identify objects in the 2-D images. Using the features determined at box 204, object detection can be performed at box 206 by determining bounding boxes for objects in the image. The features determined at box 204 can also be used to perform semantic segmentation of the digital image at box 208 in order to classify objects in the 2-D digital image.

In the second branch, in box 210 a 3D point cloud is received from various sensors that can include a digital camera, a pair of digital cameras arranged for stereoscopic imaging, Lidar, radar, etc. The sensor can further provide video data or temporally separated images. In box 210, a region of the point cloud is selected. In box 212, the processor extracts various features from the selected point cloud. In box 214, the extracted features are compared to templates of objects in order to match the extracted feature to a selected template. For example, a selected set of points forming an octagonal shape can be determined from the 3D point cloud and the octagonal shape can be matched to a template for a STOP sign in order to identify the sign. In box 216, homography computing is performed in which the identified object can be viewed from any selected perspective. The points in the identify object generally having three associate coordinates (x, y, z).

At box 220, the object detection and sematic segmentation obtained from the boxes 206 and 208, respectively, can be combined with the points of the point cloud (from box 216) in order to provide an identification and classification of an object in three-dimensions. The results of this identification can be provided to a remote processor, such as a remote server or server cloud 230. Alternatively, the remote processor 230 can be used to aid in the combination of the two-dimensional map and the three-dimensional map. Furthermore, remote processor 230 can obtain data from a plurality of vehicles in order to combine the data and provide a collaborative output based on the plurality of data. The collaborative output can help to identify an object or aid in classification or bounding box determination.

Figure 3:
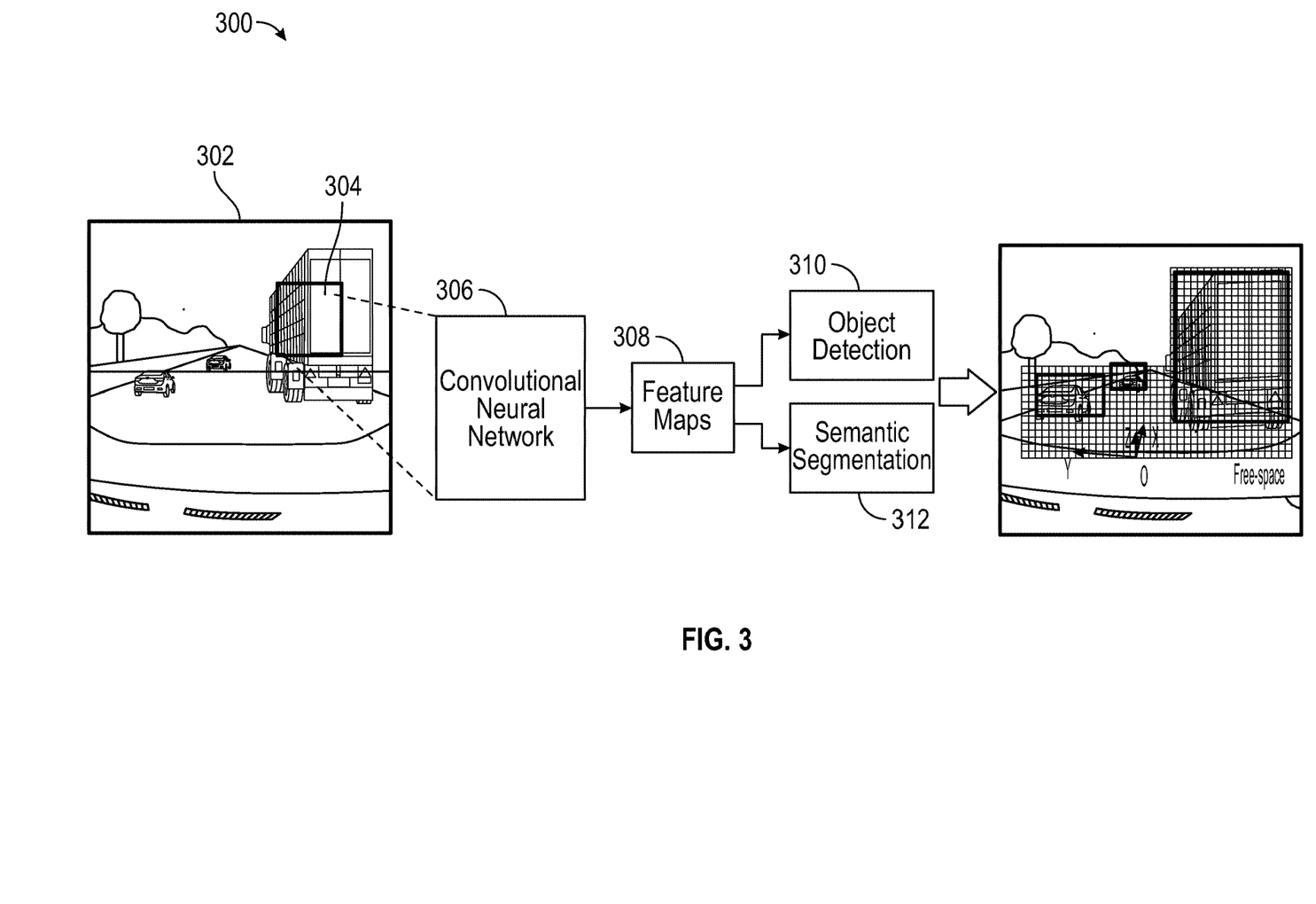
FIG. 3 illustrates a schematic diagram for determining a target object from a digital camera image.

FIG. 3 illustrates a schematic diagram 300 for determining a target object from a digital camera image. A digital image 302 is received from a digital camera. The digital image 302 is segmented according to an N×N grid. The digital image 302 is scanned by drawing a context region 304 through the digital image 302 starting from the top left corner of the digital image 302. The context region 304 scans from left to the right and from top to the bottom of the digital image 302 in a raster pattern until the entire digital image 302 is processed. The pixels enclosed by the context region 304 are sent to a convolution neural network 306 that extracts a set of feature maps 308 from the context region 304, for each location of the context region 304. The feature maps 308 can be used to determine a bounding box for the object, at box 310. Each bounding box is parametrized by a 5×1 tensor of (x, y, h, w c) where (x, y) indicate the pixel coordinates of the bounding box, (h, w) indicate the height and width of the bounding box, and c is a confidence score. The confidence score indicates how likely a target vehicle or a portion of a target vehicle is to be found inside the bounding box at box 310. Thus, the processor outputs an output tensor for the 2-D image that has dimension N×N× (M×5+C), where M is the number of bounding boxes C is the corresponding probabilities. At box 312, the feature map can also be used to perform semantic segmentation of objects in the two-dimensional image. Semantic segmentation groups pixels of the image according to separate classes, such as roadway, vehicle, traffic light, etc. Semantic segmentation enables classification of the objects in the image and also associates the classification of the objects with relevant bounding boxes. In one embodiment, the convolutional neural network (CNN) predicts the object's bounding box 310 and its class probability 312 simultaneously.

The bounding box 310 and class probability 312 can be provided to a remote processor or server for collaborative processing. Collaborative processing allows identification of objects using observations from a plurality of vehicles. Each vehicle obtains an image of a selected region as it passes through the region. The plurality of observations can be used to obtain a consensus observation or collaborative identification of objects in the region. Additionally, collaborative processing reduces errors in sensing by a single vehicle. Such collaborative processing is discussed further with respect to FIG. 7. Staying with FIG. 3, due to the transitory nature of dynamic objects in the region, such collaborative identification generally identifies static objects in the region. Thus, the remote server can provide a map of static objects in the region, which therefore provide the ability to differentiate between static objects and dynamic objects in the region.

Figure 4:
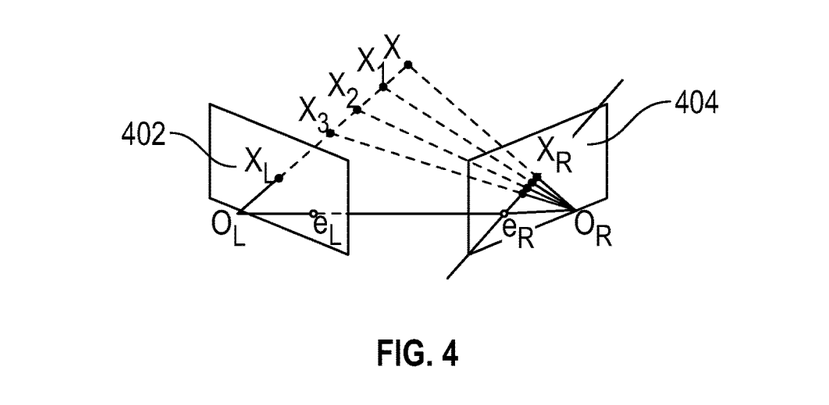
FIG. 4 illustrates methods for determining a three-dimensional point cloud using stereoscopic camera.

FIG. 4 illustrates methods for determining a three-dimensional point cloud using stereoscopic camera 400. As shown in FIG. 4, the estimated position for the left lens $O_L$ and right lens $O_R$ of the stereoscopic camera can be views as two rays coming from their respective lens locations $O_L$ and $O_R$ passing through respective key points $X_L$ and $X_R$. The location of a real world point X is given by the intersection of the two rays indicated by key points $X_L$ and $X_R$. By applying triangulation to the detected key points, it is possible to acquire the 3D point cloud information for stereo image pairs. Using epipolar geometry, $X_L$ and $X_R$ are the two corresponding key points in the image for the real world point X. $O_L$ and $O_R$ stand for the positions of left and right lenses, respectively, of the stereo camera. Two epipoles, $e_L$ and $e_R$ are the intersection between the line segment between the origins $O_L$, $O_R$ and their respective image planes 402 and 404. From only the left side view (at image plane 402), the real world point X is always located on the ray $O_L X_L$. Ray $O_L X_L$ also passes through points $X_1$, $X_2$ and $X_3$, making it difficult to determine an exact three-dimensional position of X using only the left side view. However, the right side view provides a corresponding key point $X_R$ in the right image plane 404, making it possible to determine the three-dimensional location of point X from $X_L$ and $X_R$.

Figure 5:
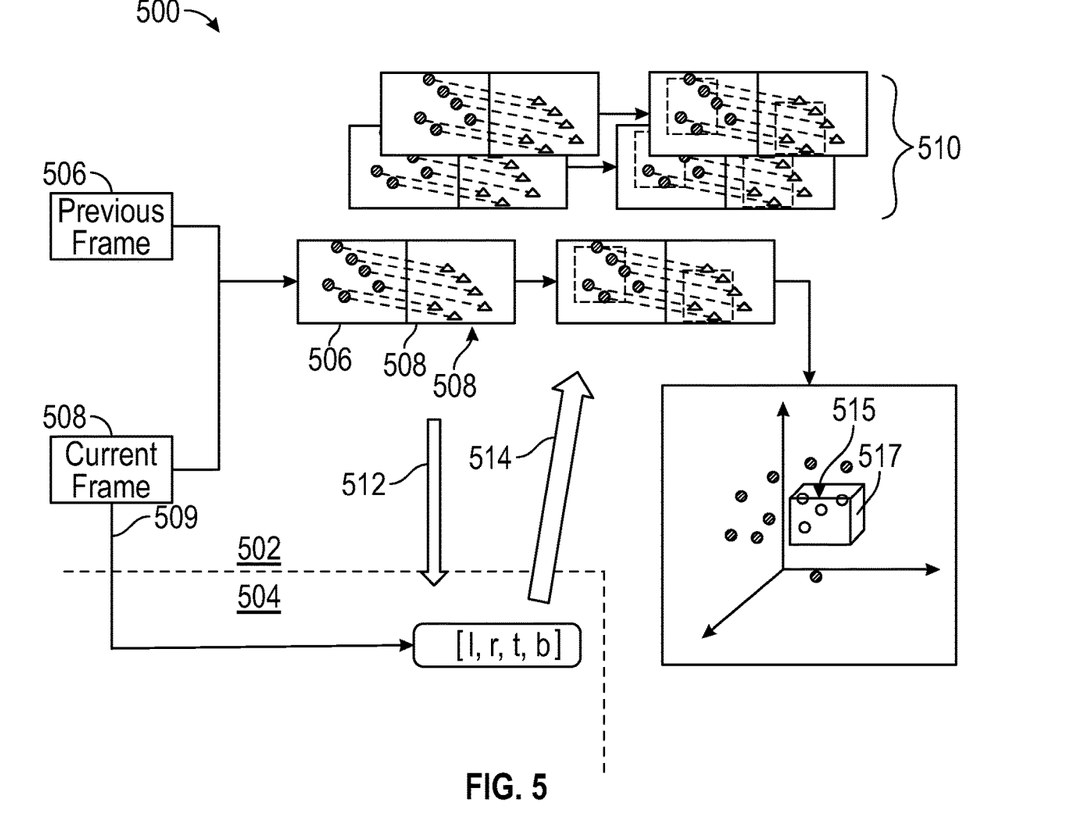
FIG. 5 illustrates schematically a system for combining two-dimensional identification, including bounding boxes and semantic classification, to the three-dimensional point cloud to extend a semantic map of a region into three dimensions.

FIG. 5 illustrates schematically a system 500 for combining two-dimensional identification, including bounding boxes and semantic classification, to the three-dimensional point cloud to extend a semantic map of a region into three dimensions. The system 500 includes a first module 502 for performing operations on the three-dimensional point cloud and a second module 504 for performing operations on the two-dimensional image. In various embodiments, the first module 502 is performed on a first processor and the second module 504 is performed on a second processor. The first processor and second processor can communicate via one or more socket interfaces so that first processor and second processor can communicate through TCP protocols. The second processor can be set as a server and the first processor is set as a client. The operations for processing the three-dimensional point cloud generally run slower that operations for processing the two-dimensional image, thus allowing the second processor to check periodically on the first processor in order to determine that the first processor and second processor are operating on a same image or set of images. In one embodiment, the second processor can be a processor of the vehicle and the first processor can be a remote processor such as a processor of a cloud server. Alternatively, the first processor can be a processor of the vehicle and the second processor can be the remote processor.

The first module 502 receives a three-dimensional point cloud from a stereoscopic camera or other three-dimensional imager. As shown in FIG. 5, the first module obtains a plurality of temporally-spaced frames, such as frames of a video or movie, and determines 3D point clouds within each of the plurality of frames. For a selected time step, the first module 502 compares points within a previous frame 506 to points within a current frame 508.

The current frame 508 is further provided to the second module 504 via arrow 509. The second module 504 determines bounding boxes for objects in the current frame 508 and performs semantic segmentation on the current frame 508 in order to provide classification of objects within the current frame 508.

Returning to the first module 502, the first module compares points with a previous frame 506 to points within a current frame 508 in order to determine common movement of points or point clusters. Such commonly moving points can be used to determine a 3-D template of an object within the 3D point cloud. Frames 510 indicates frames from other vehicles. As illustrated by frames 510, a plurality of current and previous frames from different vehicles can be used in collaboration to determine the clusters of points. Such collaboration with other vehicles reduces system error. Once a cluster of points is identified, a representative coordinate 512 of the cluster can be provided to the second module 504. The second module 504 receives the representative coordinate 512 and provides a bounding box 514 that includes or is associated with the representative coordinate to the first module 504. The first module 502 receives the bounding box 514 and applies the bounding box 514 to the 3D point cloud. As a result, the cluster of points 515 are identified with, associated with, or assigned to a three-dimensional bounding box 517.

The second module 504 can also provide a class prediction determined by semantic segmentation to the first module 502 based on a request from the first module 502. The request form the first module 502 can include the representative coordinates 512 of the cluster.

Figure 6:
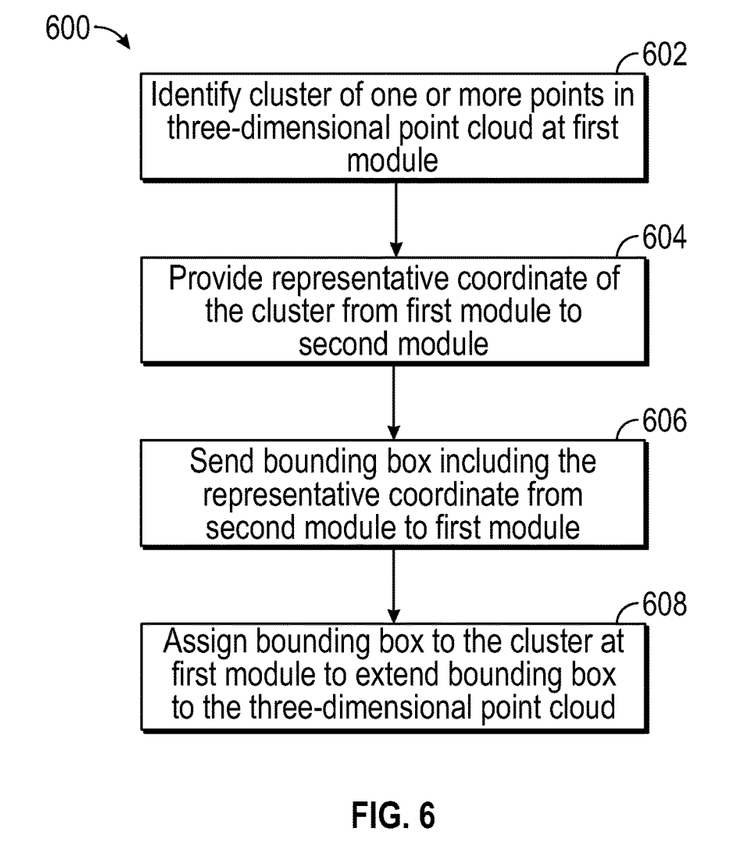
FIG. 6 shows a flowchart illustrating a method of integrating data maps determined from the two-dimensional image to data maps of a three-dimensional point cloud.

FIG. 6 shows a flowchart 600 illustrating a method of integrating data maps determined from the two-dimensional image to data maps of a three-dimensional point cloud. In box 602, a first module identifies a cluster of one or more points of the three-dimensional cloud. In one embodiment, the cluster can be identified with a three-dimensional template. The first module can be operated on a first processor. In box 604, a representative coordinate of the cluster is provided from the first module to a second module. The second module can be operating on a second processor. The second module calculates and/or stores bounding boxes and semantic classes relates to objects from a two-dimensional image. In general, the objects correspond to points clusters in the 3-D point cloud. In box 606, the second module sends a bounding box that includes, or is associated with, the representative coordinate to the first module. In box 608, the first module associates or assigns the bounding box to a selected point or points of the cluster of points in order to extend the bounding box to points of the 3-D point cloud. Semantic classification can similarly be extended to the points of the 3-D point cloud.

Figure 7:
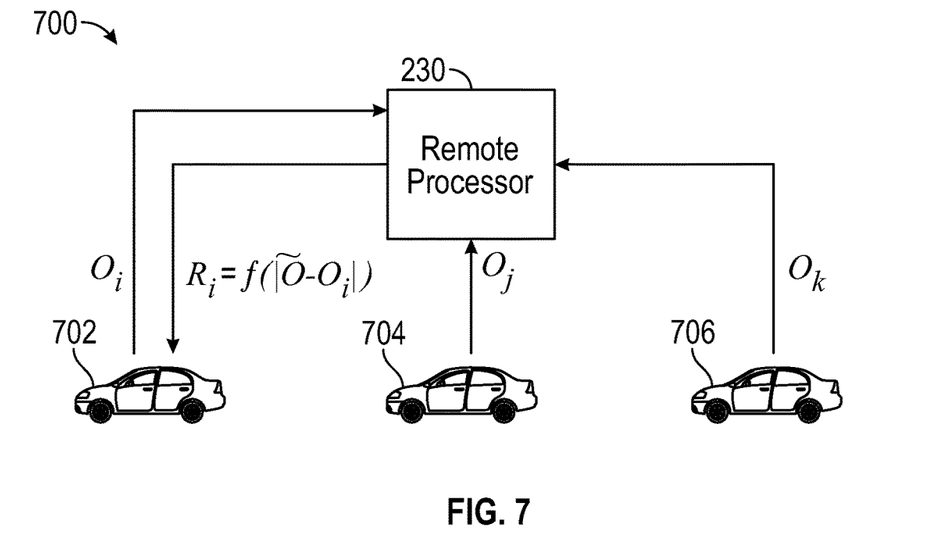
FIG. 7 illustrates a processing system for obtaining a collaborative identification of an object using an initial identification of the object from various vehicles.

FIG. 7 illustrates a processing system 700 for obtaining a collaborative identification of an object using an initial identification of the object from various vehicles. A remote processor (230, FIG. 2) is shown in communication with vehicles 702, 704 and 706. Each vehicle provides data to the remote processor 203. For illustrative purposes, vehicle 702 provides data $O_i$ indicating an initial identification of an object (e.g. a STOP sign) as recorded and classified by the vehicle 702. Vehicles 702 and 704 similarly provide data $O_j$ and data $O_k$. The remote processor 230 receives data $O_i$, $O_j$ and $O_k$ and determines a collaborative identification $\tilde{O}$ of the object using this data. The collaborative identification $\tilde{O}$ can be provided to vehicles 702, 704 and 706. Using the plurality of data helps to reduce system errors in identifying the object. From the collaborative identification $\tilde{O}$ and the initial identification $O_i$ from vehicle 702, a reputation $R_i = f(|\tilde{O} - O_i|)$ of vehicle 702 for providing data that is consistent with the collaborative data can be determined. The reputation of vehicle 702 can then be considered during future collaborative determinations of objects. The collaborative identification can be a collaborative determination of a bounding box, a collaborative determination of a semantic class, a collaborative determination of a point cluster, etc.

It is understood that any location will have static objects or long-term objects that are present over a long period of time. Such objects can include traffic signs, houses and buildings, curbs, trees, etc. The location will also have dynamic objects, such as vehicles, pedestrians, who are at the location for only a short period of time. It is clear that the method of collaborative identification in FIG. 7 is best used on static objects, since the dynamic objects changes between a first time when a first vehicle passes through the location and a second time when a second vehicle passes through the location.

An environment can also have a semi-dynamic object, such as a traffic light, whose presence at the location is long-term and can be considered permanent, but whose state can be considered to be temporary, since the traffic light is continuously switching between red, green and yellow on a pre-set time schedule.

Figure 8:
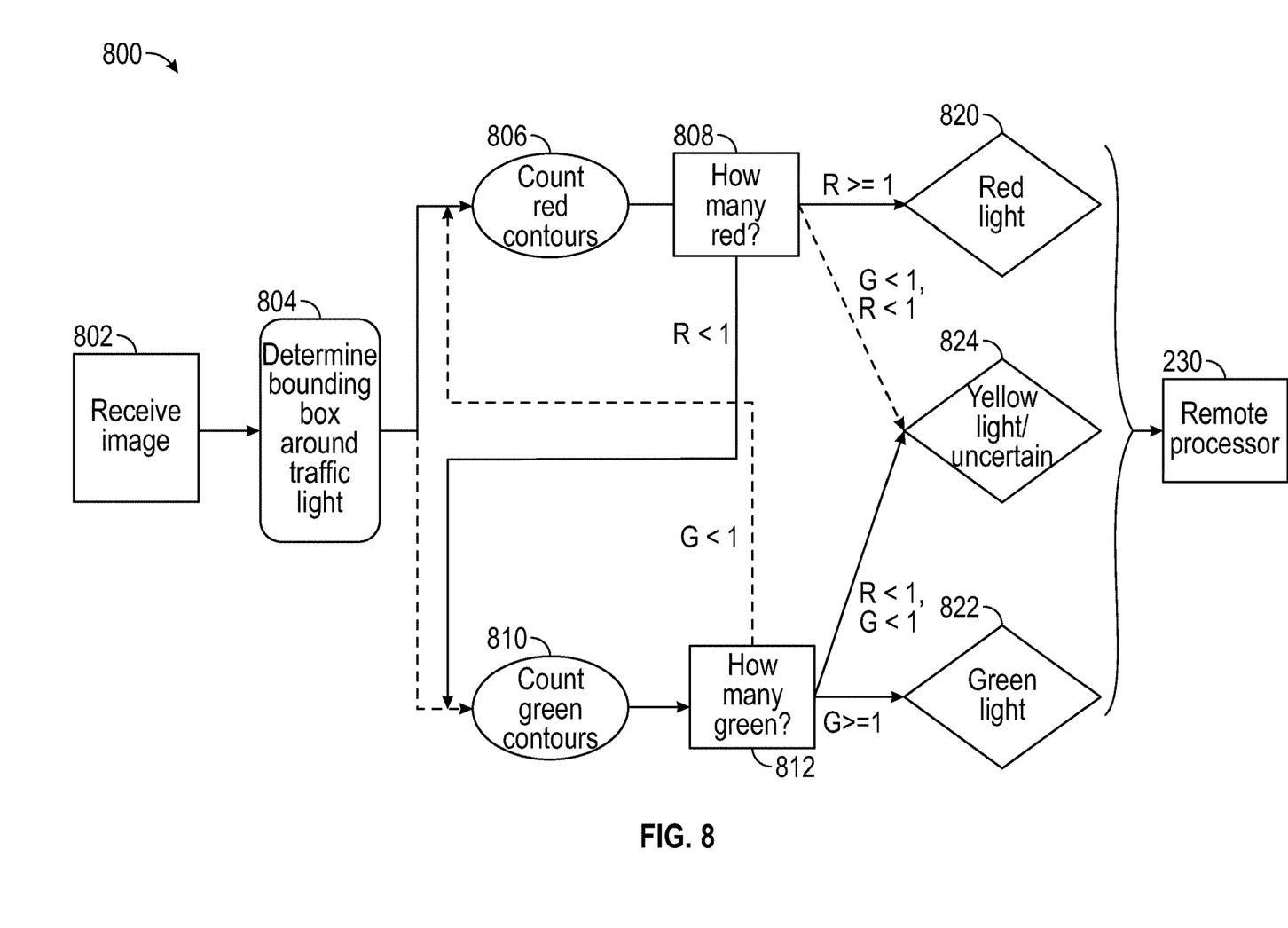
FIG. 8 shows a flowchart illustrating a method for determining a current state of a semi-dynamic object, such as a traffic light.

FIG. 8 shows a flowchart 800 illustrating a method for determining a current state of a semi-dynamic object, such as a traffic light. The method uses the bounding boxes determined using the methods discussed with respect to FIG. 3. A bounding box can be drawn around the various circles indicating lights of the traffic light. A color threshold can be applied to a bounding box. The color threshold allows a processor to count a number of contours within the bounding box defined by the color threshold. Therefore, when a red light turns on, the red color of the light will indicate a red color contour that can be identified by the processor or network.

In the flowchart 800, an image is received at box 802 and a bounding box is determined around the traffic light in box 804. From box 804, the method can proceed either to box 806 or box 810. For illustrative purposes, we proceed to box 806 which counts a number of red contours (contours defined by the threshold for the color red) within the bounding box of the traffic light. From box 806, the method proceeds to box 808. At box 808, the processor makes a decision based on how many red contours have been counted. If one or more red contours have been counted (R>=1), the processor proceeds to indicate that the traffic light is showing a red light at box 820. If the number of red contours is less than one (R<1), the method proceeds to box 810. At box 810, a number of green contours (contours defined by the threshold for the color green) is counted. At box 812, the processor makes a decision based on the number of counted green contours. If the number of green contours is greater than or equal to one (G>=1), then the method indicates a green light at box 824. However, if the number of green contours is less than one (thus G<1 and R<1), then the processor concludes that the traffic light is yellow (at box 824) or that the processor is not sure of the color of the traffic light.

Returning to box 804, this time we take the path to box 810. The logical progression through the flowchart this time is indicated by dotted lines. At box 810, the processor counts a number of green contours within the bounding box of the traffic light. At box 812, the processor makes decision based on the number of counted green contours. If the number of green contours is one or greater (G>=1), then the processor determines that the traffic light is currently showing a green light at box 822. Otherwise, if the number of green contours is less than one (G<1), the processor proceeds to box 806. At box 806, the processor counts a number of red contours. At box 808, the processor makes a decision based on the number of counted red contours. If the number of red contours is greater than or equal to 1 (R>=1), then the processor determines that the traffic light is showing red at box 820. However, if the number of red contours is less than one (thus R<1 and G<1), the processor concludes that the traffic light is yellow (at box 824), or that the processor is not sure of the color of the traffic light.

Once a traffic light color has been determined, this information can be provided to a remote processor 230. Information provide to the remote processor 230 can include the timing cycle of the light, the vehicle's location and time of observation, and a confidence level of the bounding box and of the light colors.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a vehicle, comprising:
   obtaining, at a processor, a two-dimensional (2D) image of an environment surrounding the vehicle, wherein the environment includes an object;
   obtaining, at the processor, a three-dimensional (3D) point cloud of the environment;
   identifying, by the processor, the object from the 2D image;
   determining, by the processor, a bounding box for the object from the 2D image;
   providing, by the processor, the bounding box to the 3D point cloud in order to assign the bounding box to a selected point of the 3D point cloud, thereby assigning the identification of the object to the selected point.

2. The method of claim 1, further comprising performing semantic segmentation on the 2D image to classify the object within the bounding box and providing the classification of the object to the selected point.

3. The method of claim 1, further comprising:
   determining a template of the object from one or more points of the 3D point cloud using a first module, wherein the one or more points include the selected point;
   sending a coordinate of the template from the first module to a second module, wherein the second module determines one or more bounding boxes;
   sending a bounding box including the coordinate from the second module to the first module; and
   associating, at the first module, the bounding box with the selected point.

4. The method of claim 1, wherein determining the identification of the object from the 2D image further comprises providing an initial identification from the vehicle to a remote processor and receiving a collective identification of the object form the remote processor, wherein the collective identification is an identification based on initial identifications received at the remote processor from a plurality of vehicles.

5. The method of claim 1, wherein the object is a semi-dynamic object, further comprising determining a state of the semi-dynamic object.

6. The method of claim 1, further comprising navigating the vehicle based on the identification of the selected point.

7. A system for operating a vehicle, comprising:
   a first camera system configured to obtain a three-dimensional (3D) point cloud of an environment surrounding the vehicle, wherein the environment includes an object;
   a second camera system configured to obtain a two-dimensional image of the environment; and
   at least one processor configured to:
   identify the object from the 2D image,
   determine a bounding box for the object from the 2D image; and
   provide the bounding box to the 3D point cloud in order to assign the bounding box to the selected point, thereby assigning the identification of the object to the selected point.

8. The system of claim 7, wherein the at least one processor is further configured to perform semantic segmentation on the 2D image to classify the object within the bounding box and providing the classification of the object to the selected point.

9. The system of claim 7, wherein the at least one processor further comprises:
   a first processor configured to determine a template of the object from one or more points of the 3D point cloud using a first module, wherein the one or more points include the selected point; and
   a second processor that determines a bounding box from the 2D image;
   wherein the first processor sends a coordinate of the template to the second processor, the second processor sends a bounding box including the coordinate to the first processor, and the first processor assigns the selected point to the bounding box.

10. The system of claim 7, wherein the at least one processor is further configured to determine a collective identification of the object from the 2D image by providing an initial identification from the vehicle to a remote processor and receiving the collective identification of the object from the remote processor, wherein the collective identification is an identification based on initial identifications received at the remote processor from a plurality of vehicles.

11. The system of claim 7, wherein the object is a semi-dynamic object, the at least one processor being further configured to determine a state of the semi-dynamic object.

12. The system of claim 7, wherein the at least one processor is further configured to navigate the vehicle based on the identification of the selected point.

13. A vehicle, comprising:
   a first camera system configured to obtain a three-dimensional (3D) point cloud of an environment surrounding the vehicle, wherein the environment includes an object;
   a second camera system configured to obtain a two-dimensional image of the environment; and
   at least one processor configured to:
   identify the object from the 2D image,
   determine a bounding box for the object from the 2D image,
   provide the bounding box to the 3D point cloud in order to assign the bounding box to the selected point, thereby assigning the identification of the object to the selected point, and
   navigate the vehicle based on the identification of the selected point.

14. The vehicle of claim 13, wherein the at least one processor is further configured to perform semantic segmentation on the 2D image to classify the object within the bounding box and providing the classification of the object to the selected point.

15. The vehicle of claim 14, wherein the at least one processor further comprises:
   a first processor configured to determine a template of the object from one or more points of the 3D point cloud using a first module, wherein the one or more points include the selected point; and a second processor that determines a bounding box from the 2D image;

wherein the first processor sends a coordinate of the template to the second processor, the second processor sends a bounding box including the coordinate to the first processor, and the first processor assigns the selected point to the bounding box.

16. The vehicle of claim 13, wherein the at least one processor is further configured to determine a collective identification of the object from the 2D image by providing an initial identification from the vehicle to a remote processor and receiving the collective identification of the object from the remote processor, wherein the collective identification is an identification based on initial identifications received at the remote processor from a plurality of vehicles.

17. The vehicle of claim 13, wherein the object is a semi-dynamic object, the at least one processor being further configured to determine a state of the semi-dynamic object.

* * * * *